United States Patent
Kumar B et al.

(10) Patent No.: US 11,924,209 B2
(45) Date of Patent: Mar. 5, 2024

(54) AUGMENTED REALITY-BASED ACCESS CONTROL FOR NETWORK DEVICES

(71) Applicant: International Business Machines Corporation, Armonk, NY (US)

(72) Inventors: Dinesh Kumar B, Bangalore (IN); Sarbajit K. Rakshit, Kolkata (IN); Shubjit Naik, Karnataka (IN); Srivatchsan Uthamanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 17/242,442

(22) Filed: Apr. 28, 2021

(65) Prior Publication Data

US 2022/0353265 A1 Nov. 3, 2022

(51) Int. Cl.
*H04L 29/06* (2006.01)
*H04L 9/40* (2022.01)
*G06F 3/0484* (2022.01)
*G06F 3/16* (2006.01)

(52) U.S. Cl.
CPC ............ *H04L 63/102* (2013.01); *H04L 63/20* (2013.01); *G06F 3/0484* (2013.01); *G06F 3/167* (2013.01)

(58) Field of Classification Search
CPC ..... H04L 63/102; H04L 63/20; G06F 3/0484; G06F 3/167
See application file for complete search history.

(56) References Cited

U.S. PATENT DOCUMENTS

| 8,479,266 | B1* | 7/2013 | Delker | H04L 63/20 |
| | | | | 726/4 |
| 10,437,343 | B2* | 10/2019 | Rochford | G06F 3/012 |
| 11,262,903 | B2* | 3/2022 | Lee | G06F 1/1686 |
| 2012/0194551 | A1 | 8/2012 | Osterhout et al. | |
| 2013/0293468 | A1 | 11/2013 | Perez et al. | |
| 2014/0047027 | A1 | 2/2014 | Moyers | |
| 2017/0063933 | A1* | 3/2017 | Shieh | H04L 63/0254 |

(Continued)

OTHER PUBLICATIONS

Disclosed Anonymously, "Method and System for AR-Based Configuration of IoT-Enabled Devices Based on Situational Context", ip.com, IPCOM000261475D, Mar. 7, 2020, 5 pages.

(Continued)

*Primary Examiner* — Kambiz Zand
*Assistant Examiner* — Afaq Ali
(74) *Attorney, Agent, or Firm* — Edell, Shapiro & Finnan, LLC

(57) ABSTRACT

A computer system controls access to network devices. One or more user interface elements associated with one or more network devices that are within a view of a user are displayed to the user via an augmented reality display. Input from the user is received comprising instructions to execute a command at a network device of the one or more network devices. The user is determined, according to a security policy, to be authorized to execute the command at the network device. In response to determining that the user is authorized to execute the command, the command is executed at the network device. Embodiments of the present invention further include a method and program product for controlling access to network devices in substantially the same manner described above.

20 Claims, 8 Drawing Sheets

(56) References Cited

U.S. PATENT DOCUMENTS

| | | | |
|---|---|---|---|
| 2017/0169614 A1* | 6/2017 | Tommy | H04L 12/282 |
| 2018/0026963 A1* | 1/2018 | Ning | H04W 12/08 |
| | | | 713/159 |
| 2018/0307909 A1* | 10/2018 | O'Brien | G06T 19/006 |
| 2021/0072877 A1* | 3/2021 | Kim | G06T 11/00 |
| 2021/0111972 A1* | 4/2021 | Koutitas | H04L 41/22 |

OTHER PUBLICATIONS

Disclosed Anonymously, "Method and system for contextual visual menu creation for AI Voice response system visible through Augmented Reality system", ip.com, IPCOM000259514D, Aug. 16, 2019, 5 pages.

Disclosed Anonymously, "Method and System for Enabling Augmented Reality-Based Learning for Smart Home Management", ip.com, IPCOM000260922D, Jan. 8, 2020, 4 pages.

S. Jana, et al., "Enabling Fine-Grained Permissions for Augmented Reality Applications with Recognizers", Proceedings of the 22nd USENIX Security Symposium, Aug. 14-16, 2013, Washington D.C., ISBN 978-1-931971-03-4, 17 pages.

* cited by examiner

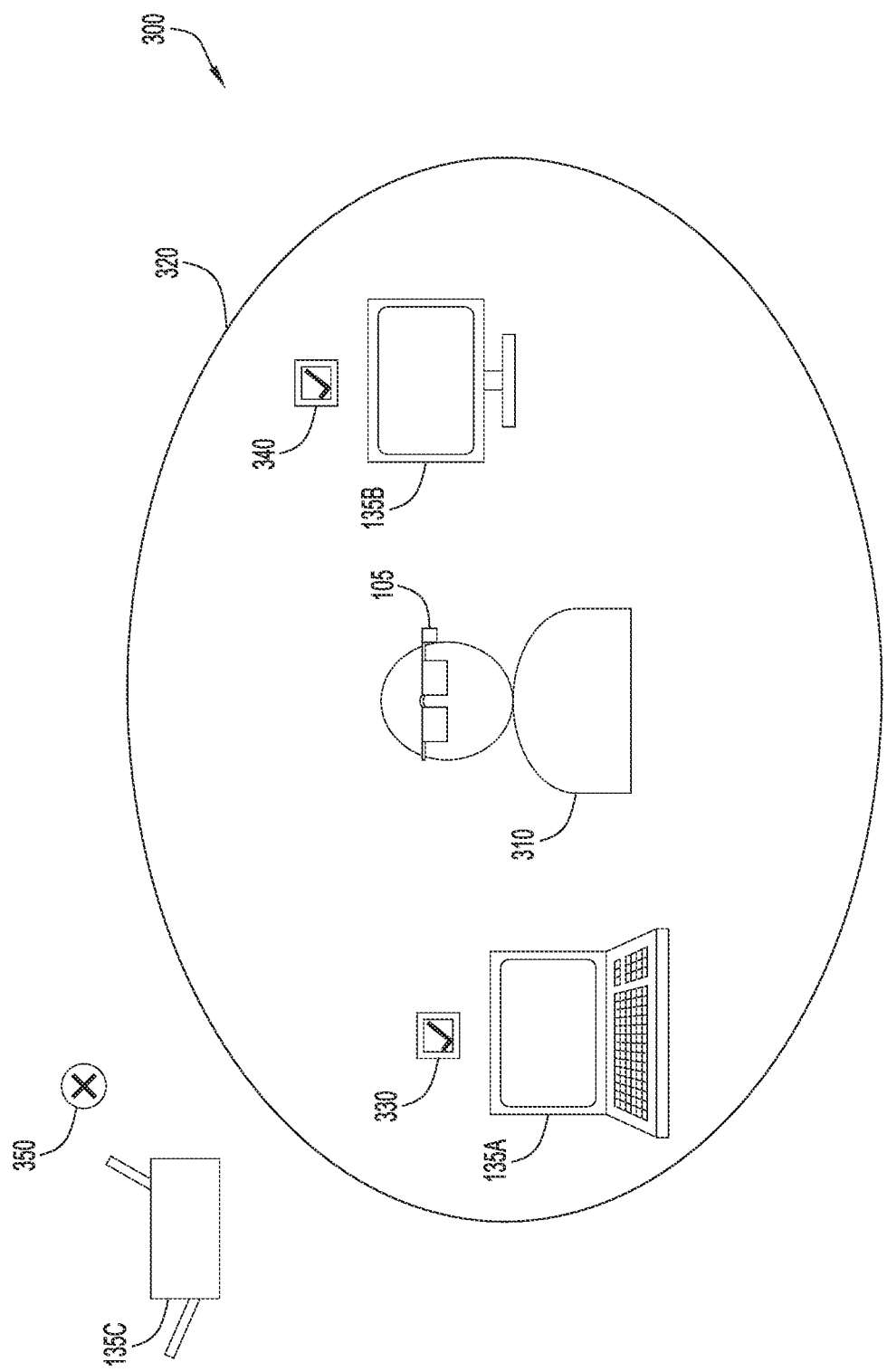

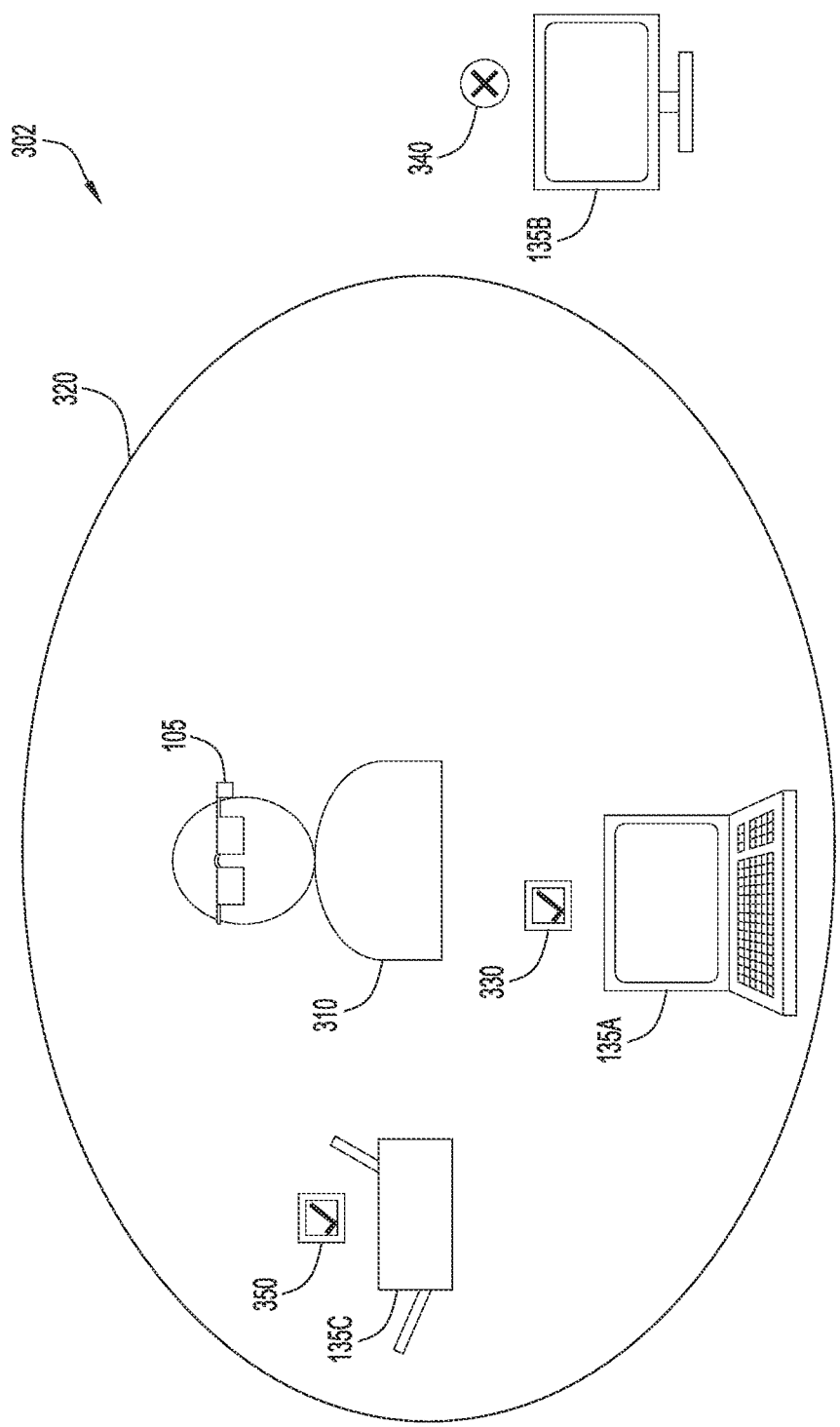

AUGMENTED REALITY-BASED ACCESS CONTROL FOR NETWORK DEVICES

BACKGROUND

1. Technical Field

Present invention embodiments relate to controlling access to network devices, and more specifically, to augmented reality-based control of access to network devices.

2. Discussion of the Related Art

Computing networks, such as home network or office networks, have become increasingly populated with devices that users can control remotely via voice or other commands. For example, home automation technologies have enabled users to remotely control computing devices such as televisions, heating, ventilation, and air conditioning (HVAC) systems, kitchen appliances, and even window curtains. As user-controllable devices become more common, security policies may often be implemented to restrict user interactions to particular devices and/or to particular actions performed by those devices. However, when multiple users and multiple network devices coexist in a same area, the relationships between user permissions and network devices can quickly become confusing.

SUMMARY

According to one embodiment of the present invention, a computer system controls access to network devices. One or more user interface elements associated with one or more network devices that are within a view of a user are displayed to the user via an augmented reality display. Input from the user is received comprising instructions to execute a command at a network device of the one or more network devices. The user is determined, according to a security policy, to be authorized to execute the command at the network device. In response to determining that the user is authorized to execute the command, the command is executed at the network device. Embodiments of the present invention further include a method and program product for controlling access to network devices in substantially the same manner described above.

BRIEF DESCRIPTION OF THE DRAWINGS

Generally, like reference numerals in the various figures are utilized to designate like components.

FIG. 3A is a diagram depicting a user environment with security visualizations in accordance with an embodiment of the present invention;

FIG. 3B is a diagram depicting a user environment with updated security visualizations in accordance with an embodiment of the present invention;

DETAILED DESCRIPTION

Figure 1:
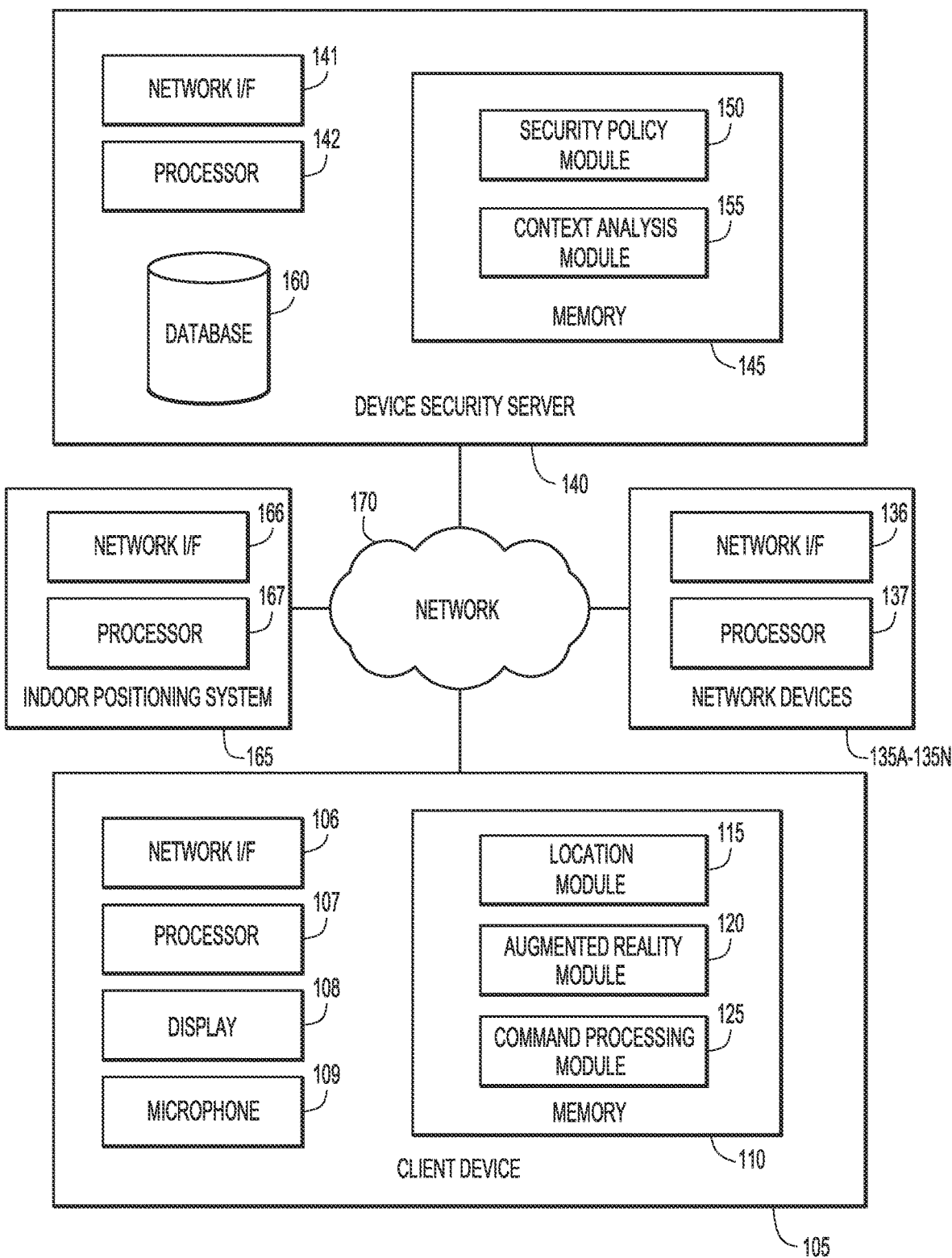
FIG. 1 is a block diagram depicting a computing environment for controlling access to network devices in accordance with an embodiment of the present invention.

Present invention embodiments relate to controlling access to network devices, and more specifically, to augmented reality-based control of access to network devices. When a computing network includes multiple users who can interact with multiple network devices, a user may be unsure as to whether or not he or she can control a particular network device, or perform a particular action at a network device. For example, a user may not be aware that he or she does not currently have permission to remotely control an entertainment system until attempting to stream media to the entertainment system. Additionally, the use of voice commands can introduce ambiguities when a user is in control of multiple devices in the user's vicinity. For example, when a user says "turn up the volume," it may be unclear as to whether the user intends the command to be executed by a nearby television or a smart speaker.

Present invention embodiments provide a security policy for network devices that enables users to visualize their permissions with respect to the network devices via an augmented reality display. Unlike virtual reality devices, which replace a user's visual field with a display, augmented reality devices instead employ a transparent screen to overlay a user's normal visual field with additional details. Present invention embodiments enable a network's security policy to be visualized to a user, who can see, via user interface elements provided by an augmented reality device, the user's permissions with respect to any network devices in the user's current view. Thus, a user can easily see, for example, the particular network devices to which the user has been granted access, a list of commands that the user can execute at a network device, and the like.

Accordingly, present invention embodiments provide the practical application of improving control over user access to network devices. By employing an augmented reality device, any ambiguities or confusion about whether a user has access to a network devices are eliminated. Moreover, a user can readily see whether other users have permission to control particular network devices, and can request permission from other users to be granted access to those devices. Accordingly, present invention embodiments improve the field of network security by providing a unique approach to how users interact with network devices in a computing network of multiple devices and multiple users, particularly with respect to voice command interactions.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for controlling access to network devices in accordance with an embodiment of the present invention. As depicted, computing environment 100 includes a client device 105, network devices 135A-135N, a device security server 140, an indoor positioning system 165, and a network 170. It is to be understood that the functional division among components of computing environment 100 have been chosen for purposes of explaining present invention embodiments and is not to be construed as a limiting example.

Client device 105 includes a network interface (I/F) 106, at least one processor 107, a display 108, a microphone 109, and memory 110. Memory 110 includes a location module 115, an augmented reality display module 120, and a command processing module 125. Client device 105 may include any programmable electronic device that is capable of executing computer readable program instructions and that includes an augmented reality display system. Network interface 106 enables components of client device 105 to send and receive data over a network, such as network 170. In general, client device 105 presents an augmented reality display to a user and enables a user to interact with network devices 135A-135N in accordance with present invention embodiments. In various embodiments, client device 105 may be a head-mounted device, a handheld device, or any other device capable of supporting augmented reality functions in accordance with present invention embodiments. Client device 105 may include internal and external hardware components, as depicted and described in further detail with respect to FIG. 6.

Display 108 may include any electronic device capable of presenting information in a visual form via an augmented reality interface. For example, display 108 may be a liquid crystal display (LCD), a cathode ray tube (CRT) display, a light-emitting diode (LED) display, an electronic ink display, and the like. In some embodiments, display 108 is a transparent or semi-transparent display, and client device 105 is mounted to a user's head such that display 108 is worn over the user's eyes and can accordingly superimpose user interface elements over the user's visual field. In some embodiments, display 108 receives real-time imagery from one or more cameras so that when a user moves the one or more cameras toward a particular view, user interface elements can be superimposed over the view.

Microphone 109 includes any transducer that can convert sound into an electrical signal. Microphone 109 enables speech of a user to be captured and processed (e.g., via command processing module 125, network devices 135A-135N, and/or device security server 140) in order for a user to issue voice commands. Thus, for example, a user of client device 105 can provide a voice command that causes instructions to be executed at a particular network device of network devices 135A-135N.

Location module 115, augmented reality display module 120, and command processing module 125 may include one or more modules or units to perform various functions of present invention embodiments described below. Location module 115, augmented reality display module 120, and command processing module 125 may be implemented by any combination of any quantity of software and/or hardware modules or units, and may reside within memory 110 of client device 105 for execution by a processor, such as processor 107.

Location module 115 enables the location of client device 105 to be tracked with respect to other devices, such as network devices 135A-135N. In particular, location module 115 can determine a distance of client device 105 from one or more network devices 135A-135N, and detect changes in distance when client device 105 and/or network devices 135A-135N change position. In some embodiments, location module 115 determines the location of client device 105 with respect to network devices 135A-135N based on data provided by indoor positioning system 165. In some embodiments, location module 115 determines the location of client device 105 with respect to network devices 135A-135N based on known or predefined locations of network devices 135A-135N in combination with a current location of client device 105 that can be determined by electromagnetic-based or sound-based triangulation or trilateration techniques.

Augmented reality display module 120 presents user interface elements to a user via display 108 to present an augmented reality view to the user. In particular, augmented reality display module 120 utilizes the locations of network devices 135A-135N relative to client device 105, as determined by location module 115, to present user interface elements on top of, or adjacent to, network devices 135A-135N. In some embodiments, augmented reality display module 120 processes images using conventional or other object recognition techniques to identify network devices 135A-135N in view of the user.

Thus, for example, in an embodiment in which client device 105 includes a head-mounted display, when a user looks at a smart television, augmented reality display module 120 presents one or more user interface elements on or adjacent to the smart television that indicate commands that the user can cause to be executed at the smart television (e.g., "change to channel three," "turn up volume," "turn down volume," etc.). Augmented reality display module 120 may update the position and/or display of user interface elements in real time as the user's view changes, in order to simulate an appearance that the user interface elements are hovering on or near their associated network devices. Augmented reality display module 120 can present text and/or icons to indicate commands that are available for a user to execute at network devices 135A-135N, and/or to indicate whether a user has permission to access network devices 135A-135N. In some embodiments, augmented reality display module 120 indicates to a user the one or more other users who have access to a network device of network devices 135A-135N. In some embodiments, augmented reality display module 120 presents a virtual boundary surrounding the user, so that a user can visually determine which network devices 135A-135N the user can control on the basis of the network devices 135A-135N being located within the boundary or outside of the boundary. In some embodiments, augmented reality display module 120 presents user interface elements that indicate a status of network devices 135A-135N, such as a volume level, a description or summary of media being played, an indication of whether the device is currently in use, a particular task or function currently being performed by a device, a current mode or setting of a device, and the like.

Command processing module 125 receives commands of a user, including voice commands obtained by microphone 109, and provides the commands to device security server 140 for evaluation against a security policy and/or for further processing. Command processing module 125 may employ speech-to-text conversion techniques to convert a user's speech to a text-based command that is then transmitted to device security server 140 via network 170. In some embodiments, command processing module 125 may be activated to receive a user command by one or more particular keywords that indicate that the user is providing a command.

Network devices 135A-135N each include a network interface (I/F) 136 and at least one processor 137. Network devices 135A-135N may include any programmable electronic device capable of executing computer readable program instructions. Network interface 141 enables components of network devices 135A-135N to send and receive data over a network, such as network 170. Network devices 135A-135N may include internal and external hardware components, as depicted and described in further detail with respect to FIG. 6.

In general, network devices 135A-135N include any devices capable of receiving executable commands via network 170 and therefore are remotely controllable by users. Network devices 135A-135N may include smart devices, such as home or office appliances, and/or Internet of Things devices. For example, network devices 135A-135N may include any television, sound speaker, washing machine, oven, ceiling fan, window blinds, heating, ventilation, and air conditioning (HVAC) system, sous vide machine, entertainment system, interior lighting, camera, smart door lock, and the like, whose functions are partially or wholly remotely controllable. Network devices 135A-135N may be registered with device security server 140, which controls user access to network devices 135A-135N via a security policy.

Device security server 140 includes a network interface (I/F) 141, at least one processor 142, memory 145, and a database 160. Memory 145 may include a security policy module 150 and a context analysis module 155. Device security server 140 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 141 enables components of device security server 140 to send and receive data over a network, such as network 170. In general, device security server 140 evaluates user commands to access network devices 135A-135N against a security policy, and determines contexts of users commands. Device security server 140 may include internal and external hardware components, as depicted and described in further detail with respect to FIG. 6.

Security policy module 150 and context analysis module 155 may include one or more modules or units to perform various functions of present invention embodiments described below. Security policy module 150 and context analysis module 155 may be implemented by any combination of any quantity of software and/or hardware modules or units, and may reside within memory 145 of device security server 140 for execution by a processor, such as processor 142.

Security policy module 150 manages and applies a security policy that defines users' level of access to network devices 135A-135N. The security policy may include, for each user, permissions that the user has with respect to particular network devices 135A-135N. User permissions can include a list of allowed commands, a list of denied commands, an indication that a user can or cannot perform any commands at a particular network device, and/or constraints on commands, such as preventing users from executing commands that would cause a device to engage in an electronic financial transaction above a certain threshold amount or at all, play content that is rated above a particular parental advisory level, and the like. For example, the security policy may indicate that a particular user can execute any supported command at a first device, can only execute a "pause playback" and "resume play" command at a second device, and can control a temperature or volume of a third device, as long as the temperature or volume is within a predefined range.

Security policy module 150 may temporarily or permanently adjust a security policy based on instructions from another user or an administrator. In particular, a user may request permission to access a device, or perform an action at a device, that the user is not currently authorized to access or perform. When security policy module 150 receives a user request for access, security policy module 150 may forward the request to an administrator and/or another user who is currently using, or has permission to use, the network device for which access is being requested. In response to receiving approval from the administrator or other user, security policy module 150 modifies the security policy to enable the user to access the requested network device.

Context analysis module 155 analyzes historical data, including historical interactions of users with network devices 135A-135N, to generate and update a knowledge corpus that enables commands to be interpreted based on the contexts in which the commands are given. In particular, context analysis module 155 determines virtual boundaries that enclose one or more of the network devices 135A-135N when a user engages in particular activities based on the user's prior history. The virtual boundaries can then be displayed to a user via display 108 of client device 105.

Context analysis module 155 determines virtual boundaries by learning associations between user commands over time. Context analysis module 155 may employ rules-based techniques to identify associations between user commands. In some embodiments, context analysis module 155 identifies an association between two or more user commands to different network devices 135A-135N when a user executes the commands within a threshold amount of time of each other a predefined number of times. Thus, for example, if a user typically listens to music while cooking, context analysis module 155 can learn, based on a history of user commands, an association between a smart speaker and a kitchen appliance.

When associations are learned, context analysis module 155 can generate a virtual boundary that encloses the network devices 135A-135N included in each association. The virtual boundary can bound off other network devices 135A-135N so that a user can see, based on the current user context, which devices the user may control. A user context can be determined when a user provides a command to one of the network devices 135A-135N that is determined to be included in the association. Thus, for example, when a user interacts with a kitchen appliance via a voice command, a virtual boundary will automatically be presented to the user to indicate that the user may issue voice commands that will be executed by the kitchen appliance and the smart speaker, as well as any other network devices 135A-135N included in the learned association. Virtual boundaries of other users may also be visible to a user via display 108 of client device 105. Thus, when there are multiple users in an environment, each user may easily see which network devices 135A-135N the user is accessing, and which network devices 135A-135N other users are accessing.

Database 160 may include any non-volatile storage media known in the art. For example, database 160 can be implemented with a tape library, optical library, one or more independent hard disk drives, or multiple hard disk drives in a redundant array of independent disks (RAID). Similarly, data in database 160 may conform to any suitable storage architecture known in the art, such as a file, a relational database, an object-oriented database, and/or one or more tables. In some embodiments, database 160 may store data including security policy data and learned context-based associations of users with network devices 135A-135N.

Indoor positioning system 165 includes a network interface (I/F) 166 and at least one processor 167. Indoor positioning system 165 may include any system for determining the relative locations of computing devices in an indoor or partially-indoor environment. Network interface 141 enables components of indoor positioning system 165 to send and receive data over a network, such as network 170. Indoor positioning system 165 may include any conventional or other techniques for determining the locations of computing devices, including client device 105 and network devices 135A-135N. Indoor positioning system 165 may include various sensors, receivers, transmitters, transceivers, speakers, microphones, and/or cameras located throughout an environment to support any indoor positioning techniques.

In various embodiments, indoor positioning system 165 can measure distances using anchor nodes with fixed positions, such as wireless access points, Bluetooth® beacons, and the like, or may employ magnetic positioning, dead reckoning, objection recognition, triangulation, trilateration, and/or any other techniques for determining the locations of computing devices. The locations of devices, including client device 105 and/or network devices 135A-135N, may be made accessible via network 170 to client device 105, network devices 135A-135N, and/or device security server 140 to enable present invention embodiments to determine a location of client device 105 in relation to network devices 135A-135N and to support context-based virtual boundaries.

Network 170 may include a local area network (LAN), a wide area network (WAN) such as the Internet, or a combination of the two, and includes wired, wireless, or fiber optic connections. In general, network 170 can be any combination of connections and protocols known in the art that will support communications between client device 105, network devices 135A-135N, device security server 140, and indoor positioning system 165 via their respective network interfaces in accordance with embodiments of the present invention.

Figure 2A:
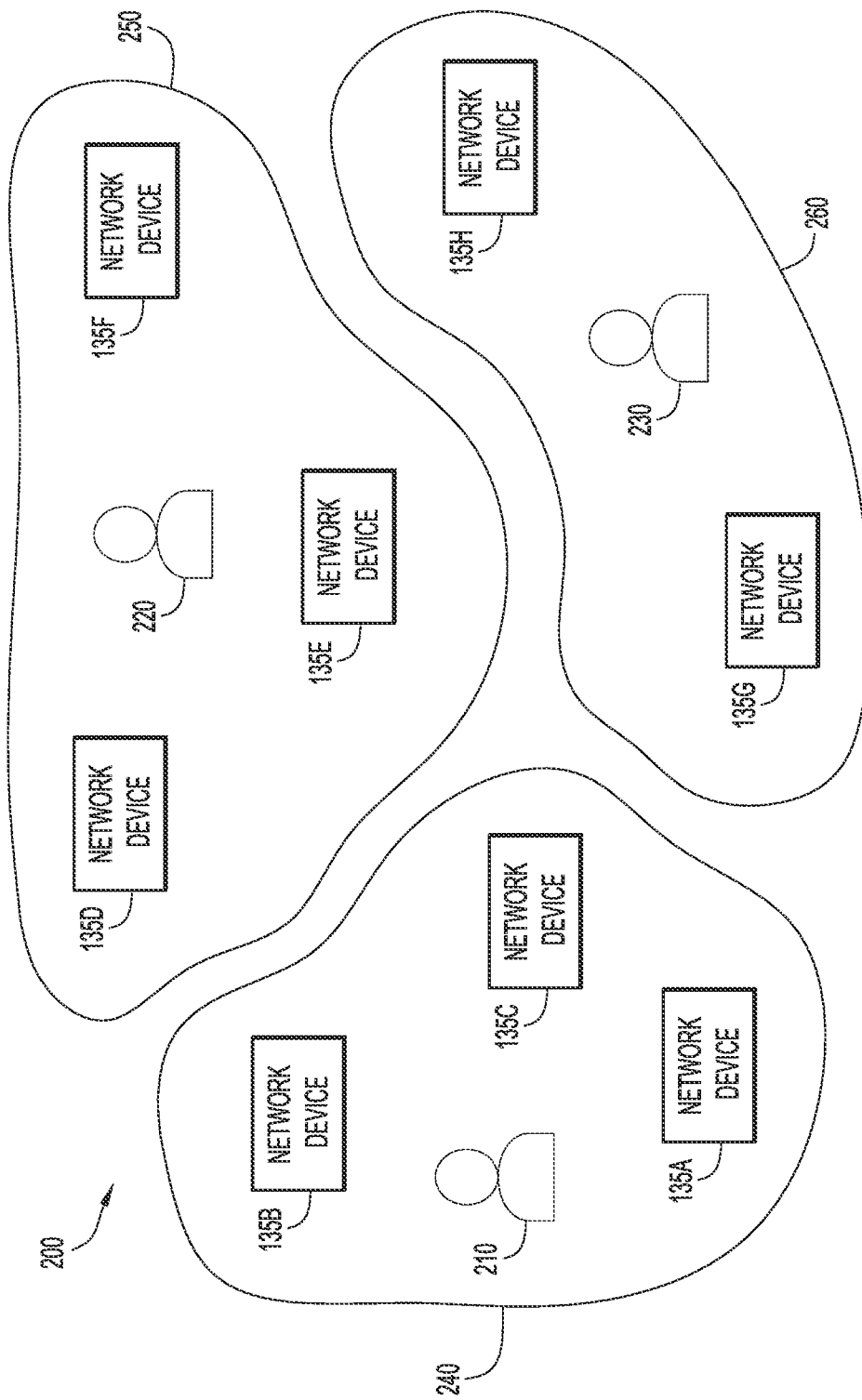
FIG. 2A is a block diagram depicting a user environment prior to modifying user permissions in accordance with an embodiment of the present invention.

FIG. 2A is a block diagram depicting a user environment 200 prior to modifying user permissions in accordance with an embodiment of the present invention. As depicted, user environment 200 includes three users 210-230, network devices 135A-135H, and virtual boundaries 240-260. User 210 has permission to execute commands at network devices 135A, 135B, and 135C, as indicated by virtual boundary 240. Similarly, user 220 has permission to execute commands at network devices 135D, 135E, and 135F, as indicated by virtual boundary 250, and user 230 has permission to execute commands at network devices 135G and 135H, as indicated by virtual boundary 260.

Figure 2B:
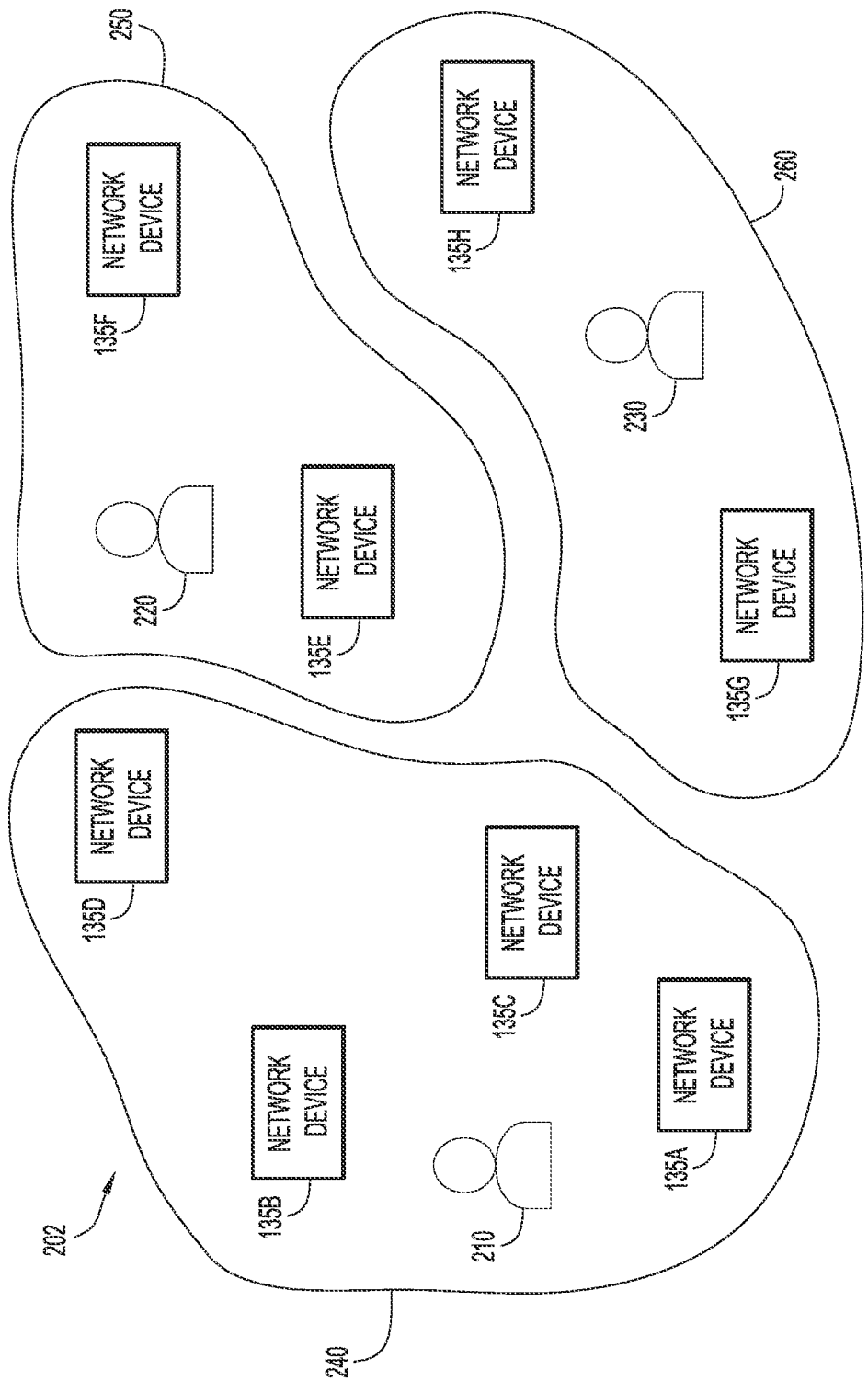
FIG. 2B is a block diagram depicting a user environment after modifying user permissions in accordance with an embodiment of the present invention.

FIG. 2B is a block diagram depicting a user environment 202 after modifying user permissions in accordance with an embodiment of the present invention. As a result of modifying the user permissions depicted in user environment 200 of FIG. 2A, network device 135D, which was formerly associated with user 220, has now been associated with user 210. Accordingly, virtual boundaries 240 and 250 have been updated to reflect the change in association of network device 135D.

In some embodiments, a device such as network device 135D may change associations by user request. For example, user 210 may request permission to execute commands at network device 135D, and the request may be granted by an administrator and/or the user associated with the network device at the time of the request (e.g., user 220). In some embodiments, a user may indicate whether a request to access a network device is temporary or permanent, or the individual who grants the request can stipulate whether the device will be change in permissions is temporary or permanent. In some embodiments, a change in context may cause user permissions to be modified with respect to a device. For example, user 210 may provide a command to network device 135B, which may have an association with network device 135D, causing an automatic request for user 210 to be granted permissions at network device 135D to be made.

FIG. 3A is a diagram depicting a user environment 300 with security visualizations in accordance with an embodiment of the present invention. As depicted, user environment 300 includes a user 310 with client device 105, a virtual boundary 320, three network devices 135A-135C, and three user interface elements 330, 340, and 350. Network devices 135A-135C are physical objects, whereas virtual boundary 320 and user interface elements 330, 340, and 350 are visible to user 310 in augmented reality provided via client device 105.

In the depicted example, virtual boundary 320 is defined as a generally circular or elliptical area around user 310. Virtual boundary 320 can be presented as any border, such as a solid line, a dashed line, a shaded area, or any other indicator. While virtual boundary 320 is illustrated as a generally circular or elliptical area in the depicted example, virtual boundary 320 can include any geometric or irregular shape as necessary to indicate to a user which network devices the user has permission to access. A user may be able to execute at least one command at network devices that are within a virtual boundary, such as network devices 135A and 135C contained within virtual boundary 320. The size or extent of virtual boundary 320 may be defined according to a security policy.

User interface elements 330, 340, and 350 may be presented to a user adjacent to their respective network devices 135A, 135B, and 135C. User interface elements that are presented to a user via client device 105 can indicate whether a user has permission to execute commands at a network device. In the depicted example, a check mark icon indicates to user 310 that the user has permission to execute commands at network devices 135A and 135B, whereas the "x" icon indicates to the user that the user does not have permission to execute commands at network device 135C. User interface elements can also show particular commands that a user may execute at network devices, as well as words or phrases that the user can utter as voice commands to control the network devices.

FIG. 3B is a diagram depicting a user environment 302 with updated security visualizations in accordance with an embodiment of the present invention. User environment 302 is a result of user 310 moving from the location in which the user is depicted in user environment 300. As user 310 moves through the environment, client device 105 updates virtual boundary 320 based on the position of user 310. In the depicted example, the security policy may in part enable users to execute commands at network devices based on a proximity of the user to the network device. Thus, as user 310 moves toward network device 135C and away from network device 135B, virtual boundary 320 has been updated accordingly, and the security visualizations have also updated. In particular, user 310 may no longer execute commands at network device 135B, and may now execute commands at network device 135C.

Figure 4:
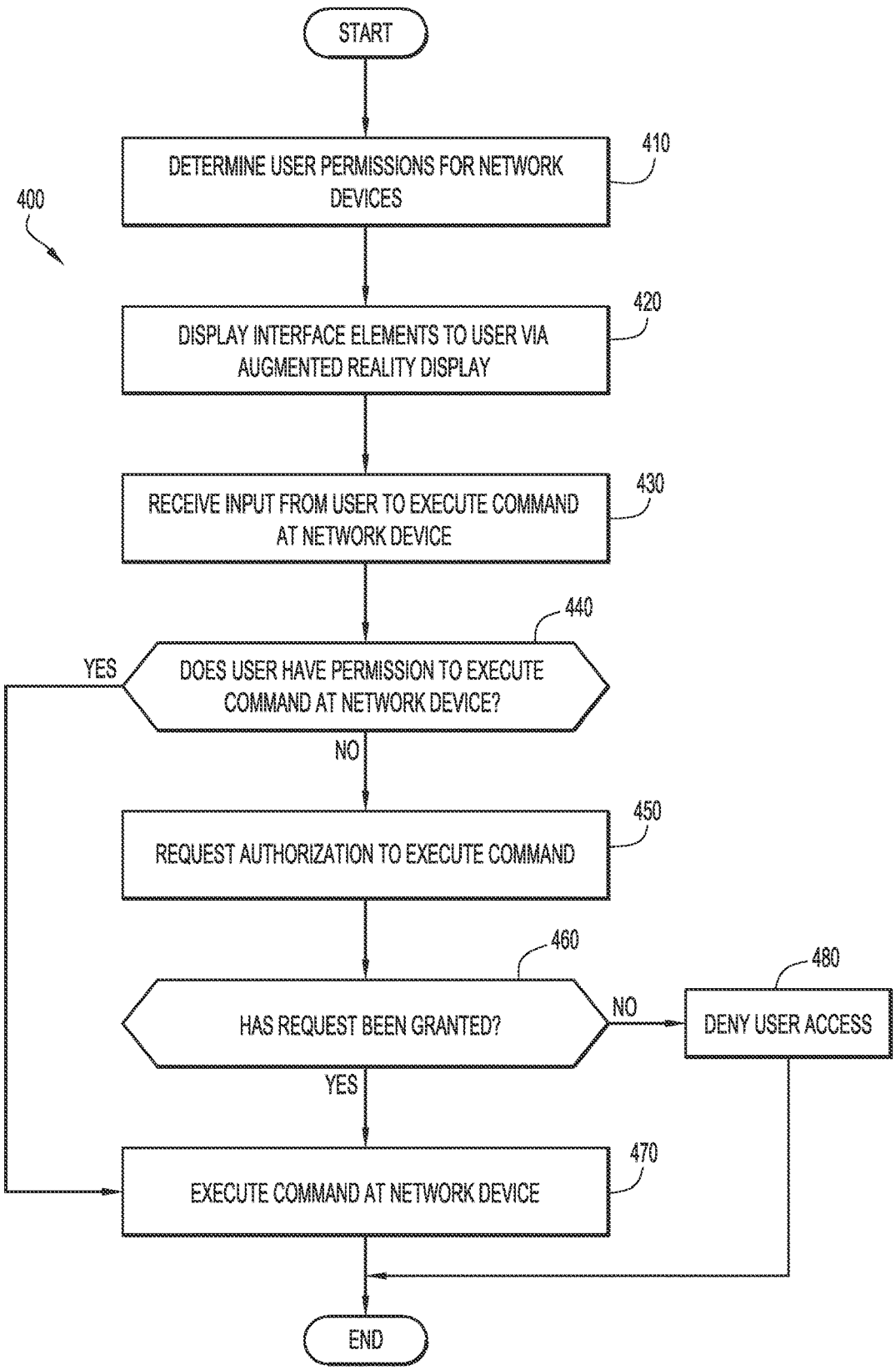
FIG. 4 is a flow chart depicting a method of controlling user access to network devices in accordance with an embodiment of the present invention

FIG. 4 is a flow chart depicting a method 400 of controlling user access to network devices in accordance with an embodiment of the present invention.

User permissions for network devices are determined at operation 410. A user may be identified by the user's client device 105 being recognized by device security server 140, which stores security policy information for the user. In some embodiments, the user may authenticate with client device 105 by entering a password or based on biometric data, such as voice analysis, retina scanning, and the like. The permissions of a user with respect to network devices 135A-135N can be determined by a security policy that is enforced by device security server 140. In particular, permissions can be user-specific (e.g., a user can or cannot execute particular commands at any device), can be device-specific (e.g., a particular command can or cannot be executed by any user at a particular network device), can be based on a physical proximity of a user to a network device, and can be based on other factors, such as a time of day, the presence or absence of other users, and the like. Some commands may be limited in scope, such as limiting a user from setting a temperature outside of a predefined range, or spending more than a predefined amount of money in a digital transaction. In some embodiments, user permissions can be mapped to particular security roles; for example, user accounts that are defined as children may have fewer permission than user accounts that are defined as adults, administrator accounts may have permissions that are not granted to other accounts, and guest accounts may be granted temporary access to devices and limited to only a few commands and/or network devices.

User interface elements are displayed to a user via an augmented reality display at operation 420. Client device 105 displays user interface elements to the user that are based on the user permissions determined at operation 410. The user interface elements can include indications of whether a user can execute commands at particular network devices or not, and may additionally include a list of some or all commands that a user can execute at network devices.

Input from the user that includes a request to execute a command at a network device is received at operation 430. The input may be received in the form of a voice command, which can be converted to text by client device 105 or forwarded to device security sever 140 for conversion to text before additional processing.

At operation 440, it is determined whether the user has permission to execute the requested command at a network device. The particular network device is determined based on the command and in addition, if necessary, the context of the command. Device security server 140 determines if the user has permission to execute the command at a single network device. If the user is authorized to execute the command at a single network device, then the command is executed at the network device at operation 470. If the command is ambiguous and could potentially be executed at multiple network devices to which the user currently has access, then context analysis module 155 of device security server 140 selects a particular network device based on the context of the command and historical interactions of the user. For example, if a user is cooking, the user's request to "turn up the volume" can be determined to apply to a smart speaker rather than a television, if the user's historical interactions indicate that the user typically listens to music while cooking.

If the user issues a command that can be identified as applying to a particular network device, and the user does not have authorization to execute that command at the network device, authorization may be requested to execute the command at operation 450. Authorization can be requested from another user that is associated with the particular network device and/or from an administrator.

At operation 460, it is determined whether the user has been granted access to the network device. If the other user or administrator grants the user access to the network device, the command may be executed at the network device at operation 470. If, however, the user is not granted access, either by another user or administrator denying the request, or the request timing out, then the request may be denied at operation 480 and the user will be unable to execute the command. In some embodiments, the user may receive a notification indicating that a request has been denied.

Figure 5:
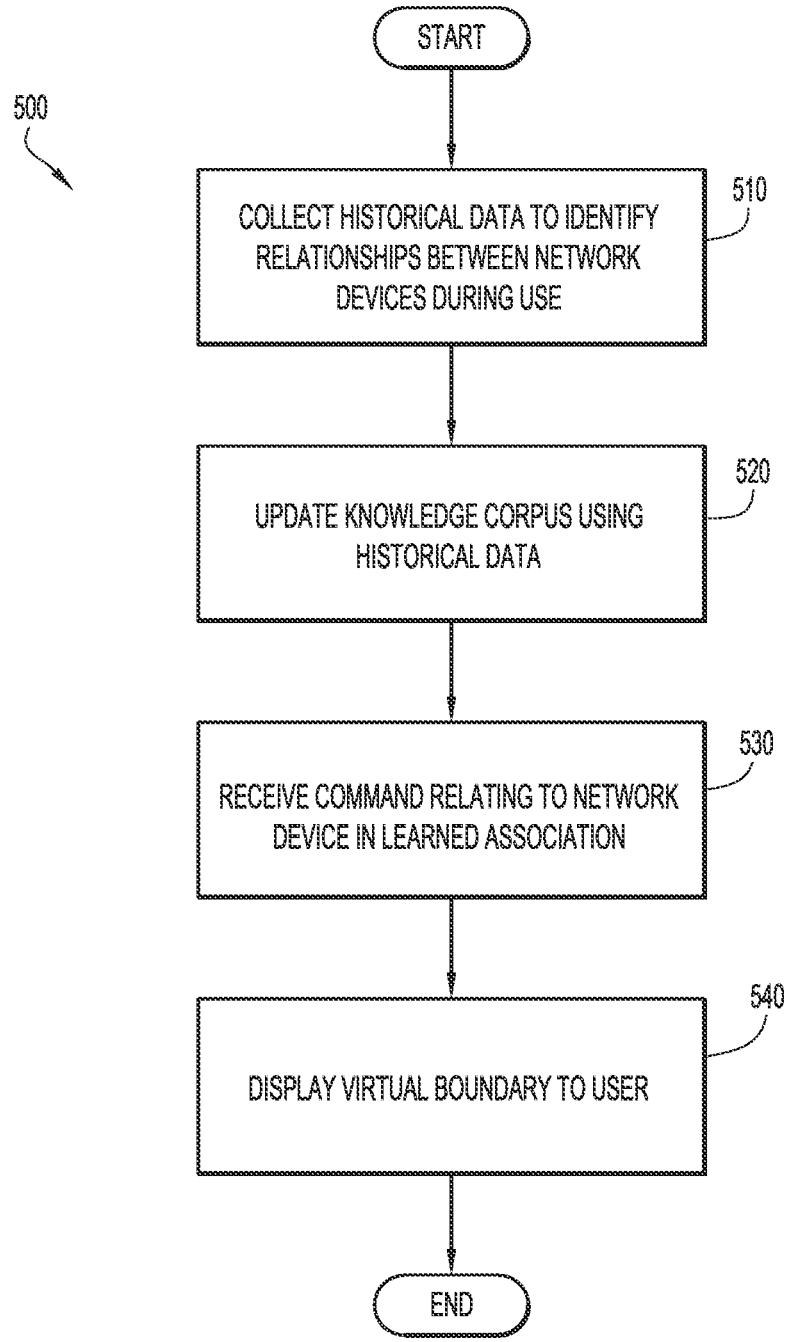
FIG. 5 is a flow chart depicting a method of context-based device access control in accordance with an embodiment of the present invention.

FIG. 5 is a flow chart depicting a method 500 of context-based device access control in accordance with an embodiment of the present invention.

Historical data is collected to identify relationships between network devices during use by a user at operation 510. When a user is present in a network, the user's execution of commands at network devices may be recorded over time by device security server 140 to develop a history of interactions of users with network devices.

A knowledge corpus is updated using the historical data at operation 520. The knowledge corpus may be generated by context analysis module 155 and populated with associations of users and network devices in particular contexts. For example, when a user performs a certain activity, the user may tend to execute particular commands at particular network devices. A rules-based approach can determine when historical data indicates that a user's prior patterns of use are sufficient to update the knowledge corpus by adding a new association.

A command relating to a network device that has a learned association with other network devices is received at operation 530. When a user interacts with a network device by issuing a command, context analysis module 155 may analyze the command against the knowledge corpus to determine if the user is engaging in a particular activity, based on the command, that makes the user likely to issue other commands to specific other network devices. Thus, for example, when a user is cooking, the user may be associated with network devices in the kitchen and not with a smart door lock, so that when a user issues a command to "open the door," the learned associations indicate that the user should be granted access to execute a command at a smart oven with an automatic door, rather than granted access to unlock the front door of the user's house.

A virtual boundary is displayed to a user at operation 540. The virtual boundary may be presented via an augmented reality display and can delineate the network devices that are controllable by the user from any network devices that the user is not currently authorized to access. Thus, the path or shape of the virtual boundary may be defined according to the position of network devices relative to the user as well as the context of the user, which is determined using the command of the user that is received at operation 530 with reference to the knowledge corpus.

Figure 6:
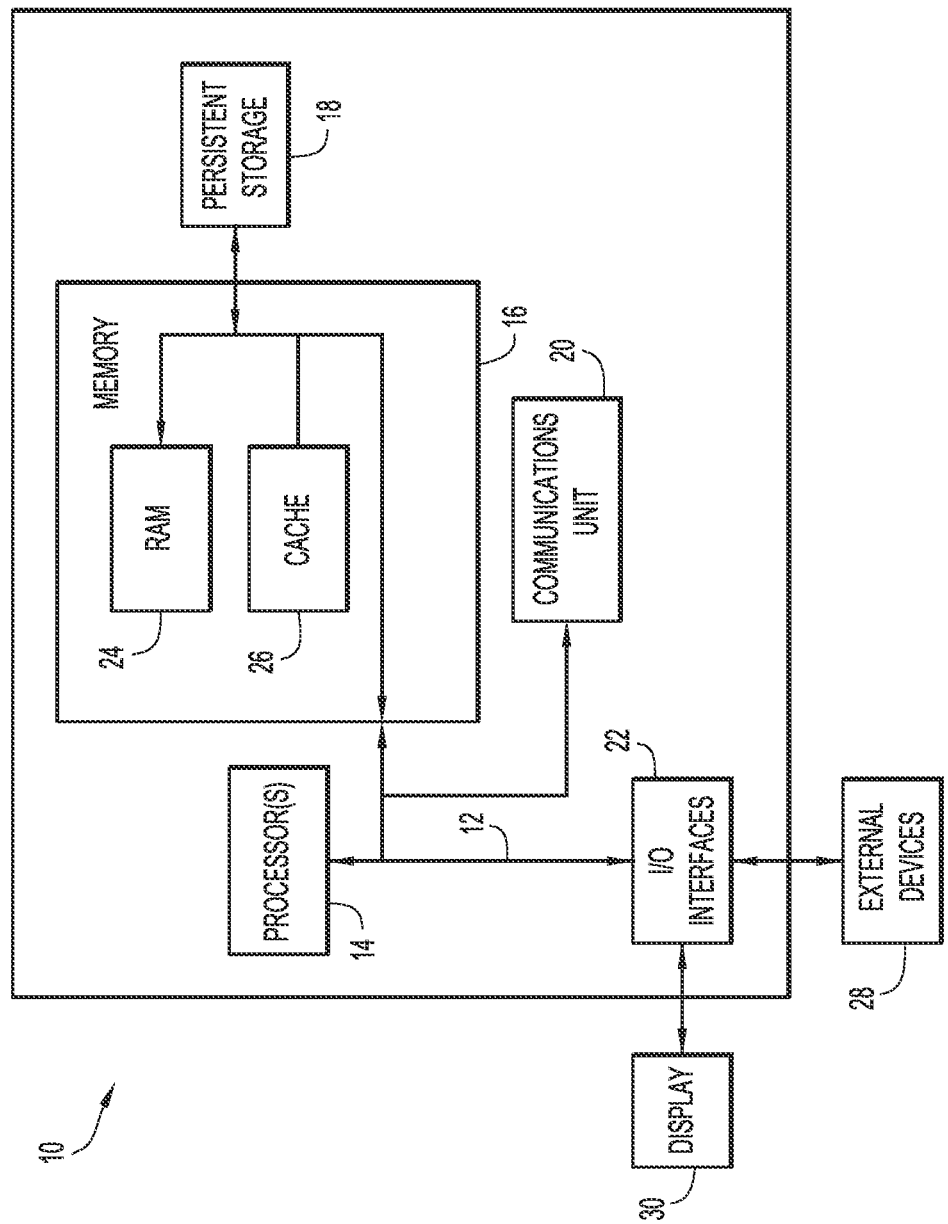
FIG. 6 is a block diagram depicting a computing device in accordance with an embodiment of the present invention.

FIG. 6 is a block diagram depicting components of a computer 10 suitable for executing the methods disclosed herein. Computer 10 may implement client device 105, network devices 135A-135N, device security server 140, and/or indoor positioning system 165 in accordance with embodiments of the present invention. It should be appreciated that FIG. 6 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to controlling user access to network devices (e.g., security policy data, historical data, knowledge corpus data, network device data, location data, augmented reality data, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105 and/or device security server 140 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to controlling user access to network devices (e.g., security policy data, historical data, knowledge corpus data, network device data, location data, augmented reality data, etc.) may include any information provided to, or generated by, client device 105, network devices 135A-135N, device security server 140, and/or indoor positioning system 165. Data relating to controlling user access to network devices may include any desired format and arrangement, and may include any quantity of any types of fields of any size to store any desired data. The data relating to controlling user access to network devices may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to controlling user access to network devices), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving control over access to network devices, including visualizing user permissions and accurately executing commands based on user contexts.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, location module 115, augmented reality display module 120, command processing module 125, security policy module 150, context analysis module 155, etc.). These systems may include any types of monitors and input devices (e.g., keyboard, mouse, voice recognition, etc.) to enter and/or view information.

It is to be understood that the software (e.g., communications software, server software, location module 115, augmented reality display module 120, command processing module 125, security policy module 150, context analysis module 155, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, location module 115, augmented reality display module 120, command processing module 125, security policy module 150, context analysis module 155, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to controlling user access to network devices). The database system may be implemented by any number of any conventional or other databases, data stores or storage structures (e.g., files, databases, data structures, data or other repositories, etc.) to store information (e.g., data relating to controlling user access to network devices). The database system may be included within or coupled to the server and/or client systems. The database systems and/or storage structures may be remote from or local to the computer or other processing systems, and may store any desired data (e.g., data relating to controlling user access to network devices).

The present invention embodiments may employ any number of any type of user interface (e.g., Graphical User Interface (GUI), command-line, prompt, etc.) for obtaining or providing information (e.g., data relating to controlling user access to network devices), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, security policies for network devices that are remotely controllable by users.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for controlling access to network devices using an augmented reality interface, the method comprising:
   displaying to a user, via an augmented reality display, one or more user interface elements associated with one or more network devices that are within a view of the user, wherein a particular user interface element indicates a user permission status of a particular network device with which the particular user interface element is associated;
   receiving input from the user comprising instructions to execute a command at a network device of the one or more network devices;
   determining, according to a security policy, that the user is authorized to execute the command at the network device; and
   in response to determining that the user is authorized to execute the command, causing the command to be executed at the network device.

2. The computer-implemented method of claim 1, wherein the network device to execute the command is selected based on a context of the input from the user.

3. The computer-implemented method of claim 2, wherein the context is determined based on historical interactions of the user.

4. The computer-implemented method of claim 1, wherein the one or more user interface elements further indicate one or more of: a command executable at the network device, and an operational status of the network device.

5. The computer-implemented method of claim 1, further comprising:
   displaying, via the augmented reality display, a virtual boundary that encloses at least one of the network devices, of a plurality of network devices within a view of the user through the augmented reality display, for which the user is authorized to execute commands, wherein the virtual boundary is defined according to the security policy.

6. The computer-implemented method of claim 1, wherein the user is initially unauthorized to execute the command at the particular network device when the input from the user is received, and further comprising:
   requesting permission for the user to execute the command at the particular network device; and
   updating the security policy to authorize the user to execute the command at the particular network device.

7. The computer-implemented method of claim 1, wherein the input from the user comprises speech of the user.

8. A computer system for controlling access to network devices using an augmented reality interface, the computer system comprising:
   one or more computer processors;
   one or more computer readable storage media;
   program instructions stored on the one or more computer readable storage media for execution by at least one of the one or more computer processors, the program instructions comprising instructions to:
      display to a user, via an augmented reality display, one or more user interface elements associated with one or more network devices that are within a view of the user, wherein a particular user interface element indicates a user permission status of a particular network device with which the particular user interface element is associated;
      receive input from the user comprising instructions to execute a command at a network device of the one or more network devices;
      determine, according to a security policy, that the user is authorized to execute the command at the network device; and
      in response to determining that the user is authorized to execute the command, cause the command to be executed at the network device.

9. The computer system of claim 8, wherein the network device to execute the command is selected based on a context of the input from the user.

10. The computer system of claim 9, wherein the context is determined based on historical interactions of the user.

11. The computer system of claim 8, wherein the one or more user interface elements further indicate one or more of: a command executable at the network device, and an operational status of the network device.

12. The computer system of claim 8, wherein the program instructions further comprise instructions to:
   display, via the augmented reality display, a virtual boundary that encloses at least one of the network devices, of a plurality of network devices within a view of the user through the augmented reality display, for which the user is authorized to execute commands, wherein the virtual boundary is defined according to the security policy.

13. The computer system of claim 8, wherein the user is initially unauthorized to execute the command at the particular network device when the input from the user is received, and wherein the program instructions further comprise instructions to:
   request permission for the user to execute the command at the particular network device; and
   update the security policy to authorize the user to execute the command at the particular network device.

14. The computer system of claim 8, wherein the input from the user comprises speech of the user.

15. A computer program product for controlling access to network devices using an augmented reality interface, the computer program product comprising one or more computer readable storage media collectively having program instructions embodied therewith, the program instructions executable by a computer to cause the computer to:
   display to a user, via an augmented reality display, one or more user interface elements associated with one or more network devices that are within a view of the user, wherein a particular user interface element indicates a user permission status of a particular network device with which the particular user interface element is associated;
   receive input from the user comprising instructions to execute a command at a network device of the one or more network devices;
   determine, according to a security policy, that the user is authorized to execute the command at the network device; and
   in response to determining that the user is authorized to execute the command, cause the command to be executed at the network device.

16. The computer program product of claim 15, wherein the network device to execute the command is selected based on a context of the input from the user.

17. The computer program product of claim 16, wherein the context is determined based on historical interactions of the user.

18. The computer program product of claim 15, wherein the one or more user interface elements further indicate one or more of: a command executable at the network device, and an operational status of the network device.

19. The computer program product of claim 15, wherein the program instructions further cause the computer to:
   display, via the augmented reality display, a virtual boundary that encloses at least one of the network devices, of a plurality of network devices within a view of the user through the augmented reality display, for which the user is authorized to execute commands, wherein the virtual boundary is defined according to the security policy.

20. The computer program product of claim 15, wherein the user is initially unauthorized to execute the command at the particular network device when the input from the user is received, and wherein the program instructions further cause the computer to:
   request permission for the user to execute the command at the particular network device; and
   update the security policy to authorize the user to execute the command at the particular network device.

* * * * *